United States Patent
Xiao et al.

(10) Patent No.: US 10,754,187 B2
(45) Date of Patent: Aug. 25, 2020

(54) DISPLAY ASSEMBLY AND ELECTRONIC APPARATUS

(71) Applicant: BOE Technology Group Co., Ltd., Beijing (CN)

(72) Inventors: Li Xiao, Beijing (CN); Minghua Xuan, Beijing (CN); Xiaochuan Chen, Beijing (CN); Shengji Yang, Beijing (CN); Lei Wang, Beijing (CN); Pengcheng Lu, Beijing (CN); Dongni Liu, Beijing (CN); Liang Chen, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 1 day.

(21) Appl. No.: 16/043,084

(22) Filed: Jul. 23, 2018

(65) Prior Publication Data

US 2019/0204665 A1    Jul. 4, 2019

(30) Foreign Application Priority Data

Jan. 2, 2018  (CN) .......................... 2018 1 0001526

(51) Int. Cl.
  *G02F 1/1335*  (2006.01)
  *G02F 1/155*   (2006.01)
  (Continued)

(52) U.S. Cl.
  CPC ........ *G02F 1/133512* (2013.01); *G02F 1/136* (2013.01); *G02F 1/13439* (2013.01);
  (Continued)

(58) Field of Classification Search
  CPC ..... G09G 2300/0426; G09G 2320/028; G09G 3/38; G09G 3/3688; G09G 2320/0626;
  (Continued)

(56) References Cited

U.S. PATENT DOCUMENTS

| | | | |
|---|---|---|---|
| 7,639,320 B2 * | 12/2009 | Itou | G02F 1/133555 349/106 |
| 9,684,204 B2 * | 6/2017 | Sakai | G02F 1/133555 |

(Continued)

FOREIGN PATENT DOCUMENTS

| | | |
|---|---|---|
| CN | 103439846 A | 12/2013 |
| CN | 103941468 A | 7/2014 |

OTHER PUBLICATIONS

Office Action issued in corresponding Chinese Patent Application No. 201810001526.X, dated Mar. 2, 2020.

*Primary Examiner* — Duc Q Dinh
(74) *Attorney, Agent, or Firm* — McDermott Will & Emery LLP

(57) ABSTRACT

A display assembly and an electronic apparatus are provided. The display assembly includes: a first substrate and a second substrate opposite to each other; a liquid crystal layer between them; a first part including a first light shielding portion, a second light shielding portion and an electrochromic portion; and a second part, including a third light shielding portion, a fourth light shielding portion and a transparent portion, wherein the first part is arranged on a side of the first substrate facing towards the second substrate; wherein the second part is arranged on a side of the second substrate facing towards the first substrate; and wherein a first electrode layer and a second electrode layer are arranged between the first substrate and the second substrate and configured to adjust states of liquid crystal molecules in the liquid crystal layer.

19 Claims, 4 Drawing Sheets

(51) Int. Cl.
*G02F 1/1345* (2006.01)
*G02F 1/1343* (2006.01)
*G02F 1/1333* (2006.01)
*G02F 1/136* (2006.01)
*G02F 1/157* (2006.01)
*G02F 1/13357* (2006.01)

(52) U.S. Cl.
CPC .... *G02F 1/13452* (2013.01); *G02F 1/133345* (2013.01); *G02F 1/134309* (2013.01); *G02F 1/155* (2013.01); *G02F 1/157* (2013.01); *G02F 2001/133565* (2013.01); *G02F 2001/133618* (2013.01); *G02F 2201/30* (2013.01); *G02F 2201/44* (2013.01); *G02F 2203/01* (2013.01); *G02F 2203/30* (2013.01)

(58) Field of Classification Search
CPC ....... G09G 2320/066; G09G 2320/068; G09G 3/3677; G09G 3/36; G09G 2320/0252; G09G 3/3406; G09G 2300/0478; G09G 5/10; G09G 2320/0646; G09G 2320/0686; G09G 3/2096; G09G 2300/023; G09G 2380/04; G09G 3/18; G09G 3/3426; H01L 29/78633; G06F 1/1647; A61K 8/9789; A61K 8/922; A61K 8/345; A61K 8/9794; A61K 8/347; A61K 8/732; A61K 8/29; A61K 8/37; A61K 8/55; A61K 8/498; A61K 8/988; A61K 2800/43; A61Q 1/10; G02F 1/136; G02F 1/136209
USPC ........ 345/1.1, 1.2, 1.3, 2.1, 2.2, 2.3, 87–102
See application file for complete search history.

(56) References Cited

U.S. PATENT DOCUMENTS

| | | |
|---|---|---|
| 2010/0002175 A1 | 1/2010 | Kim et al. |
| 2012/0147059 A1* | 6/2012 | Chen ................. G02B 27/2214 345/690 |
| 2013/0063406 A1* | 3/2013 | Nishino ................ G02F 1/1345 345/204 |
| 2015/0035872 A1* | 2/2015 | Shima ............... G02F 1/133514 345/690 |
| 2015/0286091 A1 | 10/2015 | Zhang et al. |
| 2015/0338714 A1 | 11/2015 | Li |
| 2017/0160846 A1* | 6/2017 | Wang ..................... G02F 1/155 |

* cited by examiner

DISPLAY ASSEMBLY AND ELECTRONIC APPARATUS

CROSS-REFERENCE TO RELATED APPLICATION

This application claims the priority benefit of Chinese Patent Application No. 201810001526.X filed on Jan. 2, 2018, entitled "DISPLAY ASSEMBLY AND ELECTRONIC APPARATUS", which is incorporated herein by reference in its entirety.

BACKGROUND

Technical Field

Embodiments of the present disclosure relate to the field of a display apparatus, and in particular, to a display assembly, and an electronic apparatus.

Description of the Related Art

As display technology develops, various manufacturers of display panels have paid more attention on transparent screens. In comparison with the conventional liquid crystal screen, the transparent screens can give the user unprecedented visual feeling and new experiences. Since the transparent screens are screens having transparent characteristics, they can be used in various scenes, that is, they may be used as screens while they may be used to replace transparent plate glass. The user can see an object or an image on a relative surface through a screen. In the transparent display assembly in the related art, outdoor visibility is a very important issue and transmittance is one of main factors for influencing the outdoor visibility.

SUMMARY

An embodiment of the present disclosure provides a display assembly, including:
a first substrate and a second substrate opposite to each other;
a liquid crystal layer between the first substrate and the second substrate;
a first part, including a first light shielding portion, a second light shielding portion and an electrochromic portion; and
a second part, including a third light shielding portion, a fourth light shielding portion and a transparent portion,
wherein the first part is arranged on a side of the first substrate facing towards the second substrate, and the electrochromic portion is located between the first light shielding portion and the second light shielding portion in a direction parallel to the first substrate;
wherein the second part is arranged on a side of the second substrate facing towards the first substrate, and the transparent portion is located between the third light shielding portion and the fourth light shielding portion in a direction parallel to the second substrate; and
wherein a first electrode layer and a second electrode layer are arranged between the first substrate and the second substrate and configured to adjust states of liquid crystal molecules in the liquid crystal layer.

In some embodiments, projection of the transparent portion on the first layer is inside or equal to the electrochromic portion.

In some embodiments, the electrochromic portion includes an electrochromic layer, a third electrode layer and a fourth electrode layer, the third electrode layer and the fourth electrode layer being located on both sides of the electrochromic layer respectively.

In some embodiments, the display assembly further includes:
a first drive circuit electrically connected to the third electrode layer and the fourth electrode layer and configured to apply voltage between the third electrode layer and the fourth electrode layer;
a second drive circuit electrically connected to the first electrode layer and the second electrode layer and configured to apply voltage between the first electrode layer and the second electrode layer.

In some embodiments, the display assembly further includes:
a memory; and
a processor,
wherein the processor is configured to:
in response to a dark state display, send a first instruction to the first drive circuit to apply a first voltage between the third electrode layer and the fourth electrode layer, the first voltage keeping the electrochromic layer in a light shielding state; and
in response to a non-dark grayscale state display, send a second instruction to the first drive circuit to apply a second voltage between the third electrode layer and the fourth electrode layer and send a third instruction to the second drive circuit to apply a third voltage between the first electrode layer and the second electrode layer depending on grayscale, the second voltage keeping the electrochromic layer in a transparent state, the third voltage causing the liquid crystal layer to direct an amount of light corresponding to the grayscale towards the electrochromic layer.

In some embodiments, the transparent portion is a light collimator.

In some embodiments, the light collimator includes a collimating grating.

In some embodiments, voltage between the first electrode layer and the second electrode layer is controlled for varying the light emitting angle from the liquid crystal layer.

In some embodiments, the third electrode layer and the fourth electrode layer are transparent.

In some embodiments, the first light shielding portion, the second light shielding portion, the third light shielding portion and the fourth light shielding portion are formed in a black matrix.

In some embodiments, the first light shielding portion, the second light shielding portion, the third light shielding portion and the fourth light shielding portion are constructed as a black matrix.

In some embodiments, the display assembly further includes an insulation layer, which is arranged between the first electrode layer and the second electrode layer, and the first electrode layer and the second electrode layer are arranged in stack on a side of the liquid crystal layer facing towards the second substrate.

In some embodiments, the first electrode layer includes a plurality of strip electrodes in parallel to each other.

In some embodiments, the second electrode layer includes a plate electrode.

In some embodiments, the first electrode layer is arranged on a side of the liquid crystal layer facing towards the first substrate and the second electrode layer is arranged on a side of the liquid crystal layer facing towards the second substrate.

In some embodiments, the first electrode layer includes a plurality of strip electrodes in parallel to each other, and the second electrode layer includes a plate electrode; or the second electrode layer includes a plurality of strip electrodes in parallel to each other, and the first electrode layer includes a plate electrode.

In some embodiments, the display assembly further includes a resin layer which is arranged between the liquid crystal layer and the first part.

In some embodiments, each of the first substrate and the second substrate is a glass substrate.

In some embodiments, the first electrode layer includes a pixel electrode and the second electrode layer includes a common electrode.

An embodiment of the present disclosure also provides an electronic apparatus including the display assembly as described above.

DETAILED DESCRIPTION OF EMBODIMENTS

Embodiments of the present disclosure will be described in detail below with reference to the accompanying drawings; however, they are not intended to limit the present disclosure.

It should be understood that various modification may be made to the embodiments disclosed herein. Thus, the description should not be intended to limit the present disclosure, but regarded as exemplified embodiments. The skilled person in the art will envisage other modifications within scope and spirit of the present disclosure.

Drawings that are incorporated in the description and constitute a part of the description show embodiments of the present disclosure, and are intended to explain principles of the present disclosure along with the brief description of the present disclosure and the details of the embodiments given below.

From the following description of preferred examples of unlimited embodiments with reference to drawings, these and other characteristics of the present disclosure will be apparent.

It also should be understood that, the present disclosure has been described with reference to some examples, but the skilled person in the art can achieve other equivalent forms of the present disclosure explicitly that have features defined by claims and thus fall within the protect scopes defined by claims.

In conjunction with drawings, from the following detailed description, the above and other aspects, features and advantages of the present disclosure will become more apparent.

The specific embodiments of the present disclosure will be described with reference to drawings; however, it should be understood that the disclosed embodiments are only exemplified embodiments that can be implemented by various forms. Known and/or repeated functions and structures have not be described to avoid unnecessary or redundant details obscuring the present disclosure. Therefore, the specific structural and functional details of the present disclosure are not intended to limit the present disclosure, but only to teach the skilled person in the art to use the present disclosure diversifiedly in any suitable detailed structures in essential as basis of claims and representative basis.

The terms of "in an embodiment", "in another embodiment", "in a further embodiment" or "in other embodiments" used in the description each may represent one or more of same or different embodiments of the present disclosure.

Embodiments of the present disclosure will be explained below with reference to the drawings. An embodiment of the present disclosure provides a display assembly. The display assembly is a transparent display assembly and it is not necessary to arrange any polarizers in the display assembly. Different grayscales of the display assembly may be formed by setting liquid crystal states in the liquid crystal layer while relatively high transmittance can be ensured. The display assembly has characteristics of low cost, simple structure and high transmittance.

Figure 1:
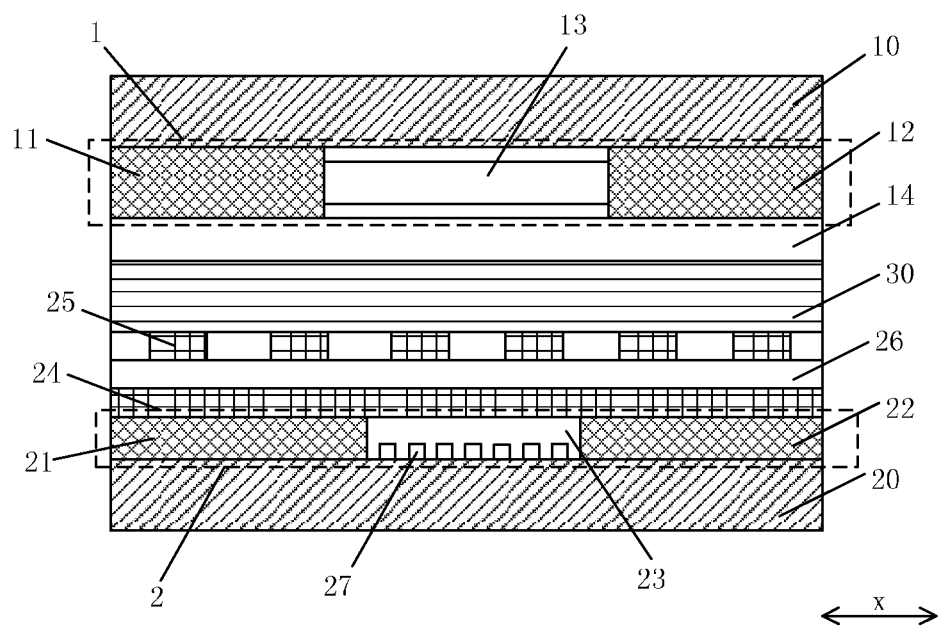
FIG. 1 is a schematic view showing a structure of a display assembly according to an embodiment of the present disclosure.

FIG. 1 is a schematic view showing a structure of a display assembly 100 in an embodiment of the present disclosure. The display assembly in the embodiment of the present disclosure may include: a first substrate 10 and a second substrate 20 opposite to each other; and a liquid crystal layer (LC) 30 between the first substrate 10 and the second substrate 20.

As an example, each of the first substrate 10 and the second substrate 20 may be made of transparent material, for example, may be a transparent glass substrate. The display assembly may include a first part 1 and a second part 2, as indicated by dashed blocks in FIG. 1 and FIG. 3. The first part 1 includes a first light shielding portion 11, a second light shielding portion 12 and an electrochromic portion 13. The second part 2 includes a third light shielding portion 21, a fourth light shielding portion 22 and a transparent portion 23. The first part 1 is arranged on a side (lower side in FIG. 1) of the first substrate 10 facing towards the second substrate 20. And the electrochromic portion 13 is located between the first light shielding portion 11 and the second light shielding portion 12 in a direction (x direction in FIG. 1) parallel to the first substrate 10. As an example, the first light shielding portion 11 and the second light shielding portion 12 may be opaque portions, for example, may be made of opaque materials. The first light shielding portion 11 and the second light shielding portion 12 may be in a form of black matrix (BM). Each of the first light shielding portion 11 and the second light shielding portion 12 may be a metal film or may alternatively be an oxide film, a resin film or a black photoresist film. A first electrode layer 25 and a second electrode layer 24 may also be arranged between the first substrate 10 and the second substrate 20. The first electrode layer 25 and the second electrode layer 24 are configured to adjust states of liquid crystal molecules in the liquid crystal layer 30. As an example, the first electrode layer 25 may include a pixel electrode and the second electrode layer 24 may include a common electrode.

Figure 2:
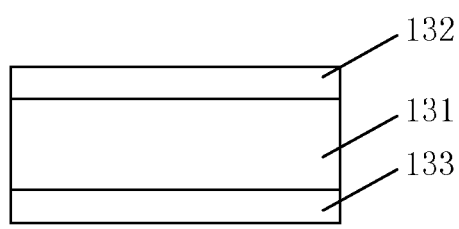
FIG. 2 is a schematic view showing a structure of an electrochromic portion in an embodiment of the present disclosure.

FIG. 2 is a schematic view showing a structure of an electrochromic portion 13 in an embodiment of the present disclosure. The electrochromic portion 13 may be constructed to show a transparent state or an opaque state depending on voltage applied to the electrochromic portion 13, so as to achieve transmission or shielding for the light. In particular, the electrochromic portion 13 may include an electrochromic layer 131, a third electrode layer 132 and a fourth electrode layer 133. The third electrode layer 132 and the fourth electrode layer 133 are located on both sides of the electrochromic layer 131 respectively. Different voltages may be applied to the electrochromic layer 131 by the third electrode layer 132 and the fourth electrode layer 133, such that the electrochromic layer 131 can switch between the transparent state and the opaque state. The third electrode layer 132 and the fourth electrode layer 133 each are transparent, for example may be a transparent electrode plate.

Figure 7:
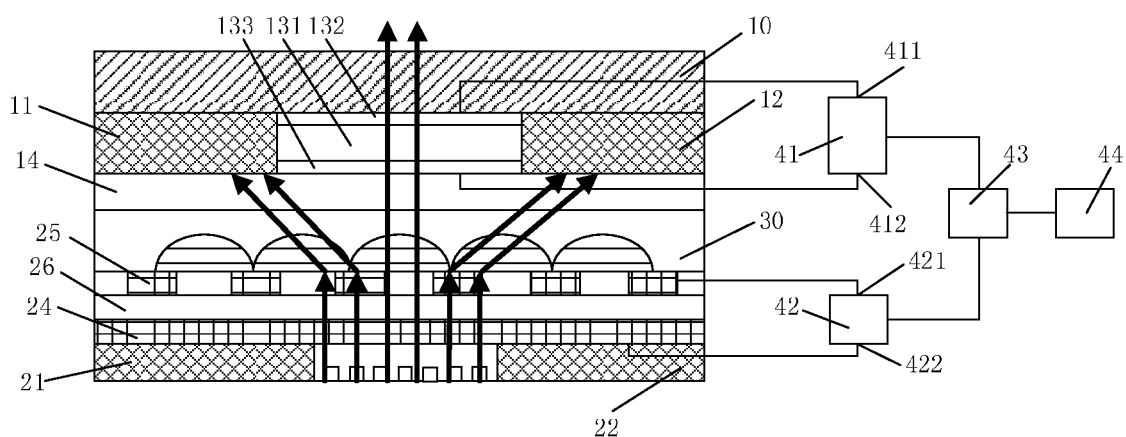
FIG. 7 is a schematic view showing a circuit module for controlling grayscale display in a display assembly according to an embodiment of the present disclosure.

As an example, as illustrated in FIG. 7, the display assembly may further include a first drive circuit 41. The first drive circuit 41 is electrically connected to the third electrode layer 132 and the fourth electrode layer 133 respectively, for example, a first terminal 411 of the first drive circuit 41 is electrically connected to the third electrode layer 132 and a second terminal 412 of the first drive circuit 41 is electrically connected to the fourth electrode layer 133. The first drive circuit 41 is configured to apply voltage between the third electrode layer 132 and the fourth electrode layer 133. The first terminal 411 and the second terminal 412 may output different voltage values respectively so as to control the voltage between the third electrode layer 132 and the fourth electrode layer 133.

In the embodiment of the present disclosure, the electrochromic layer 131 may include an electrochromic glass. The electrochromic glass may become transparent or opaque depending on voltage applied between the third electrode layer and the fourth electrode layer.

In addition, in the embodiment of the present disclosure, the second part 2 including the third light shielding portion 21, the fourth light shielding portion 22 and the transparent portion 23 is arranged on a side of the second substrate 20 facing towards the first substrate 10, and the transparent portion 23 is located between the third light shielding portion 21 and the fourth light shielding portion 22 in a direction (x direction in FIG. 1) parallel to the second substrate 20. In an embodiment, the electrochromic portion 13 may be aligned with the transparent portion 23, i.e., projection of the transparent portion on the first layer is inside or equal to the electrochromic portion, so that the light entering the transparent portion 23 can exit from the electrochromic portion 13 conveniently. As an example, the electrochromic portion 13 may have an area greater than or equal to the area of the transparent portion 23. The first electrode layer 25 and the second electrode layer 24 configured to adjust states of liquid crystal molecules in the liquid crystal layer 30 may be arranged on the second substrate 20. The respective electrodes in drawings of the present disclosure may be formed by indium tin oxide (ITO). However, it does not mean that these electrodes must be formed by ITO. Instead, other materials known in the art for forming the electrodes may also be used. Like the first light shielding portion 11 and the second light shielding portion 12, the third light shielding portion 21 and the fourth light shielding portion 22 may also be opaque, for example may be made of opaque materials. The third light shielding portion 21 and the fourth light shielding portion 22 may be formed in a black matrix (BM) or constructed as a black matrix. Each of the third light shielding portion 21 and the fourth light shielding portion 22 may be a metal film or may alternatively be an oxide film, a resin film or a black photoresist film.

As an example, shown in FIG. 7, the display assembly may further include a second drive circuit 42. The second drive circuit 42 is electrically connected to the first electrode layer 25 and the second electrode layer 24 respectively, for example, a third terminal 421 of the second drive circuit 42 is electrically connected to the first electrode layer 25 and a fourth terminal 422 of the second drive circuit 42 is electrically connected to the second electrode layer 24. The second drive circuit 42 is configured to apply voltage between the first electrode layer 25 and the second electrode layer 24.

In addition, each of the first electrode layer 25 and the second electrode layer 24 may be a transparent electrode. And the first electrode layer 25 and the second electrode layer 24 may apply voltage to the liquid crystal layer 30 such that state of the liquid crystal molecules, such as orientation state of the liquid crystal molecules or angle state of the liquid crystal molecules in the liquid crystal layer 30 may be adjusted according to the voltage value applied between the first electrode layer 25 and the second electrode layer 24. When the light entering the transparent portion 23 passes through the liquid crystal layer 30, as different states of the liquid crystal molecules can affect the light such as refract or reflect the light, the light passing through the electrochromic portion 13 can be adjusted correspondingly to form different display grayscales. As an example, voltage between the first electrode layer 25 and the second electrode layer 24 may be controlled for varying the light exit angle from the liquid crystal layer 30. It may change the amount of light passing through the electrochromic portion 13 on a basis of desired grayscales, so as to achieve the desired brightness.

Figure 4:
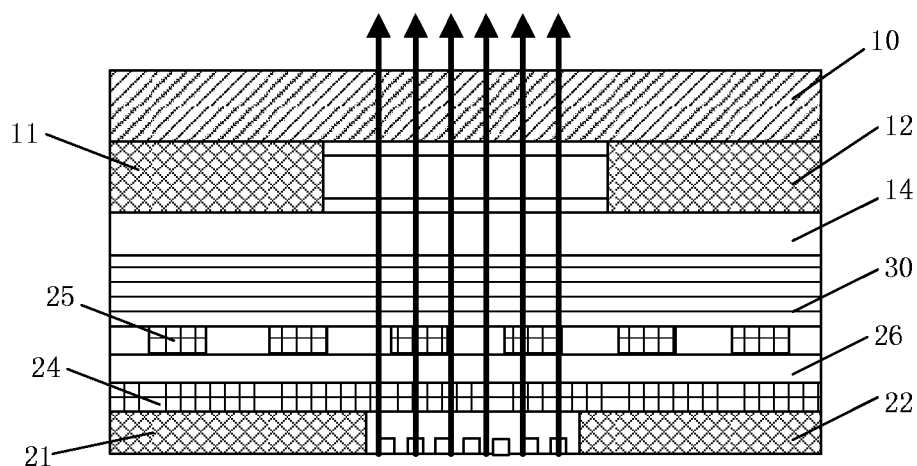
FIG. 4 is a schematic view showing a state of the display assembly in L255 grayscale.
Figure 5:
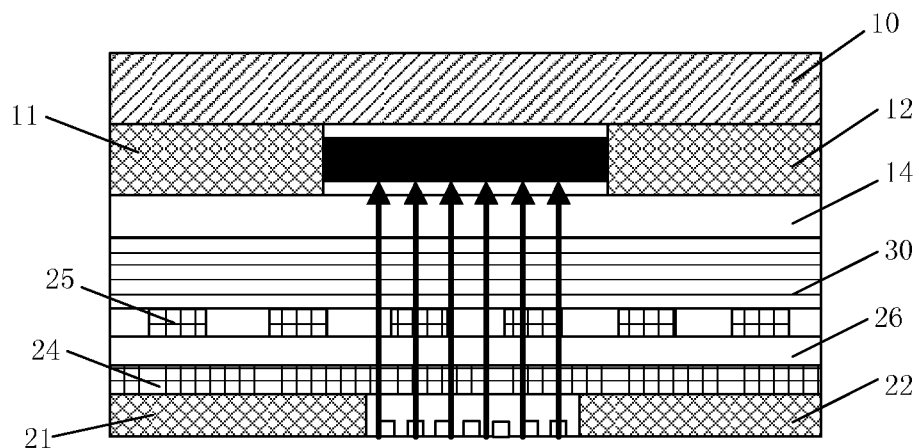
FIG. 5 is a schematic view showing a state of the display assembly in L0 grayscale.
Figure 6:
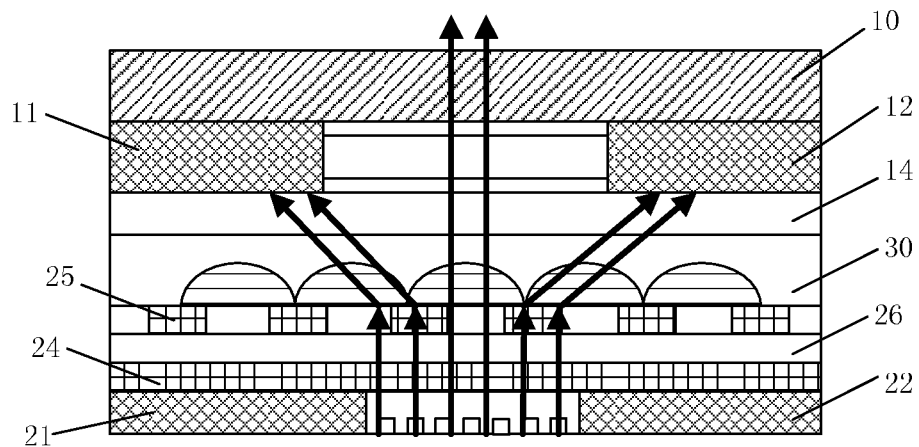
FIG. 6 is a schematic view showing a state of the display assembly in L1 to L254 grayscales.

FIG. 4 to FIG. 6 are schematic views showing states of different grayscales of the display assembly in the embodiment of the present disclosure. FIG. 4 shows schematically the state for the grayscale of L255. FIG. 5 shows schematically the state for the grayscale of L0. FIG. 6 shows schematically the state for the grayscales of L1 to L254. Here, the grayscale of L0 refers to dark state display, i.e., the light is blocked completely by the electrochromic portion 13 without being emitted out. The grayscale of L255 refers to the display state with maximum brightness. In this case, the amount of light that can pass through the electrochromic portion 13 to be emitted out is maximum. The grayscales of L1 to L254 are those between the grayscale of L0 and the grayscale of L255. The larger the numeral of the grayscale is, the more the amount of light that can pass through the electrochromic portion 13 is and the higher the display brightness is.

In an example, as illustrated in FIG. 4, a certain voltage is applied between the third electrode layer 132 and the fourth electrode layer 133 on the first substrate 10 such that the electrochromic layer 131 becomes transparent. At that time, any voltage may not be applied to the liquid crystal layer 30, i.e., any voltage may not be applied between the first electrode layer 25 and the second electrode layer 24, and the light entering the transparent portion 23 may pass through the electrochromic portion 13 directly so as to achieve the grayscale display of L255 of the display assembly.

In another example, as shown in FIG. 5, another certain voltage is applied between the third electrode layer 132 and the fourth electrode layer 133 on the first substrate 10 such that the electrochromic layer 131 can become opaque. At that time, any voltage may not be applied to the liquid crystal layer 30, i.e., any voltage may not be applied between the first electrode layer 25 and the second electrode layer 24. Since the electrochromic layer 131 is opaque, the light entering the transparent portion 23 cannot pass through the electrochromic portion 13 so as to achieve the grayscale display of L0 of the display assembly.

In another example, as illustrated in FIG. 6, another certain voltage is applied between the third electrode layer 132 and the fourth electrode layer 133 on the first substrate 10 such that the electrochromic layer 131 becomes transparent. At that time, a certain voltage may be applied to the liquid crystal layer 30, i.e., may be applied between the first electrode layer 25 and the second electrode layer 24 such that the liquid crystal molecules in the liquid crystal layer 30 will have a state corresponding to the voltage applied between the first electrode layer 25 and the second electrode layer 24. In this way, part of the light entering the transparent portion 23 may pass through the electrochromic portion 13 so as to achieve the grayscale display of L1 to L254 of the display assembly, for the different states of the liquid crystal molecules.

As an example, as shown in FIG. 7, the display assembly may further include a processor 43 configured to achieve different display states of the display assembly. The processor 43 may be configured to:

in response to a dark state display, send a first instruction to the first drive circuit to apply a first voltage between the third electrode layer and the fourth electrode layer, the first voltage keeping the electrochromic layer in a light shielding state; and in response to a non-dark grayscale state display, send a second instruction to the first drive circuit to apply a second voltage between the third electrode layer and the fourth electrode layer and send a third instruction to the second drive circuit to apply a third voltage between the first electrode layer and the second electrode layer depending on the grayscale, the second voltage keeping the electrochromic layer in a transparent state, the third voltage causing the liquid crystal layer to direct an amount of light corresponding to the grayscale towards the electrochromic layer.

The display assembly may further include a memory 44, for example, the memory 44 may be configured to store intermediate instructions for the processor 43 and predetermined display data for the grayscale display or the like. The memory 44 may be implemented as a computer readable medium. The computer readable medium may include, but not limited to, electrical, magnetic, optical, electromagnetic, infrared or semiconductor system, apparatus, device or propagation medium. The specific examples of the computer readable medium include: a magnetic storage device such as a magnetic tape or a hard disk drive (HDD); an optical storage device such as an optical disk (CD-ROM); a memory such as random access memory (RAM) or flash memory; and/or wire/wireless communication links. The processor 43 for example may be implemented as a central processing unit (CPU), an application specific integrated circuit (ASIC), a field programmable gate array (FPGA), a digital signal processor (DSP) or other integrated forms.

In the above examples, the dark state display corresponds to the display state of grayscale of L0 in FIG. 5 and the non-dark grayscale state display corresponds to the display state of the above grayscales of L1 to L255. As an example, when the display of grayscale of L255 is achieved, the third voltage applied between the first electrode layer and the second electrode layer may be zero. However, embodiments of the present disclosure are not limited to this. The third voltage needs to be determined depending on property of the liquid crystal layer 30.

In an embodiment of the present disclosure, the transparent portion 23 may be a light collimator, for example, the light collimator may include a collimating grating 27. In this way, the light may be incident from the transparent portion 23 in a direction perpendicular to the first substrate 10 (and the second substrate 20). Such operation for example can be performed by refraction or diffraction effects. Based on such arrangement, light transmission of the display assembly may further be achieved accurately. However, embodiments of the present disclosure are not limited to this, for example, the light which is incident from the transparent portion 23 may have a certain divergence angle such as not more than 5 degrees, or not more than 10 degrees. As an example, the first substrate 10 and the second substrate 20 may be arranged in parallel to each other.

As an example, the display assembly may include an insulation layer 26 arranged between the first electrode layer 25 and the second electrode layer 24. The first electrode layer 25 and the second electrode layer 24 are arranged in stack on a side of the liquid crystal layer 30 facing towards the second substrate 20.

Further, in an embodiment of the present disclosure, the first electrode layer 25 including a plurality of strip electrodes (for example, may be used as pixel electrodes) in parallel to each other may be provided on the second substrate 20. The second electrode layer 24 including a plate electrode (for example, may be used as a common electrode) may also be provided on the second substrate 20. For example, by means of controlling voltages of the strip electrodes in the first electrode layer 25 and voltage of the electrode in the second electrode layer 24, states of the liquid crystal molecules at positions corresponding to different strip electrodes (for example pixel electrodes) may be adjusted.

For example, each of the first electrode layer 25, the second electrode layer 24 and the insulation layer 26 is made from transparent material. The first electrode layer 25 and the second electrode layer 24 may be transparent electrodes. The insulation layer 26 may be made from glass or resin material. The first electrode layer 25 and the second electrode layer 24 may be electrically connected to the second drive circuit 42 respectively, for example, may be connected to different output terminals of the second drive circuit respectively. The respective output terminals may output different voltage values respectively, so as to control the voltage between the first electrode layer 25 and the second electrode layer 24. In an embodiment of the present disclosure, the first drive circuit and the second drive circuit may be constructed as the same structure or different structures. In the embodiment of the present disclosure, the first drive circuit and the second drive circuit may include data processing chips, single chip microcomputers or other electronic devices that can output different voltage values.

Figure 3:
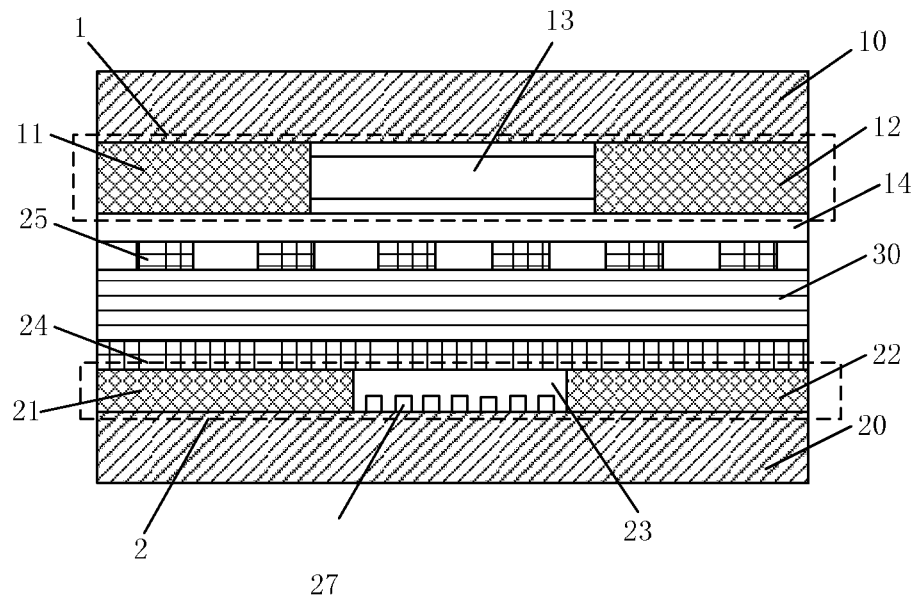
FIG. 3 is a schematic view showing a structure of a display assembly according to an embodiment of the present disclosure.

In another embodiment, as shown in FIG. 3, the first electrode layer 25 may be arranged on one side of the liquid crystal layer 30 facing towards the first substrate 10 and the second electrode layer 24 may be arranged on the other side of the liquid crystal layer 30 facing towards the second substrate 20. That is, the first electrode layer 25 and the second electrode layer 24 may be located on both sides of the liquid crystal layer 30 respectively, instead of being arranged in stack on one side of the liquid crystal layer 30. Similar to the above embodiment, as an example, the first electrode layer 25 includes the plurality of strip electrodes (for example, may be used as pixel electrodes) in parallel to each other and the second electrode layer 24 includes the plate electrode (for example, may be used as the common electrode); or the second electrode layer 24 includes the plurality of strip electrodes and the first electrode layer 25 includes the plate electrode.

In addition, in an embodiment of the present disclosure, the display assembly may include a resin layer 14 arranged between the liquid crystal layer 30 and the first part 1, for achieving the effects of protection and insulation.

In the embodiments of the present disclosure, for example, the first electrode layer 25 may include a pixel electrode and the second electrode layer 24 may include a common electrode.

As discussed above, in the embodiment of the present disclosure, liquid crystal prisms may be formed by different states of the liquid crystal molecules, so as to control optical path of the light. In such arrangement, polarizers are not necessary any longer. Not only the transmittance of the display assembly in whole can increase, but also transparent display can be achieved. In addition, in the embodiments of the present disclosure, different voltages may be used to control different forms (states) of the liquid crystal molecules in the liquid crystal layer such that the liquid crystal layer may output the collimated light at a fixed emitting angle or the light with a relatively large divergence angle, so as to achieve different display functions for different grayscales.

In embodiments of the present disclosure, a light source may for example be arranged on one side of the second substrate 20 (for example, the left side or right side of the second substrate 20 in FIG. 1) or both sides of the second substrate 20.

In addition, an embodiment of the present disclosure may also provide a liquid crystal display screen. The liquid crystal display screen may include the display assembly as described in any of the above embodiments. The display assembly may include a display drive device, for example the above first drive circuit 41 and the second drive circuit 42. In this way, the display assembly may be driven to display different grayscales.

In addition, an embodiment of the present disclosure may also provide an electronic apparatus. The electronic apparatus may include the above display assembly or liquid crystal display screen. The electronic apparatus in the embodiment of the present disclosure may include a cell phone, a television, any computer or other apparatus having a display screen.

As discussed above, in the embodiment of the present disclosure, liquid crystal prisms may be formed by different states of the liquid crystal molecules, so as to control optical path of the light. In such arrangement, polarizers are not necessary any longer. Not only the transmittance of the display assembly in whole can increase, but also transparent display can be achieved. In addition, in the embodiments of the present disclosure, different voltages may be used to control different forms (states) of the liquid crystal molecules in the liquid crystal layer such that the liquid crystal layer may output the collimated light at a fixed emitting angle or the light with a relatively large divergence angle, so as to achieve different display functions for different grayscales.

Figure 8:
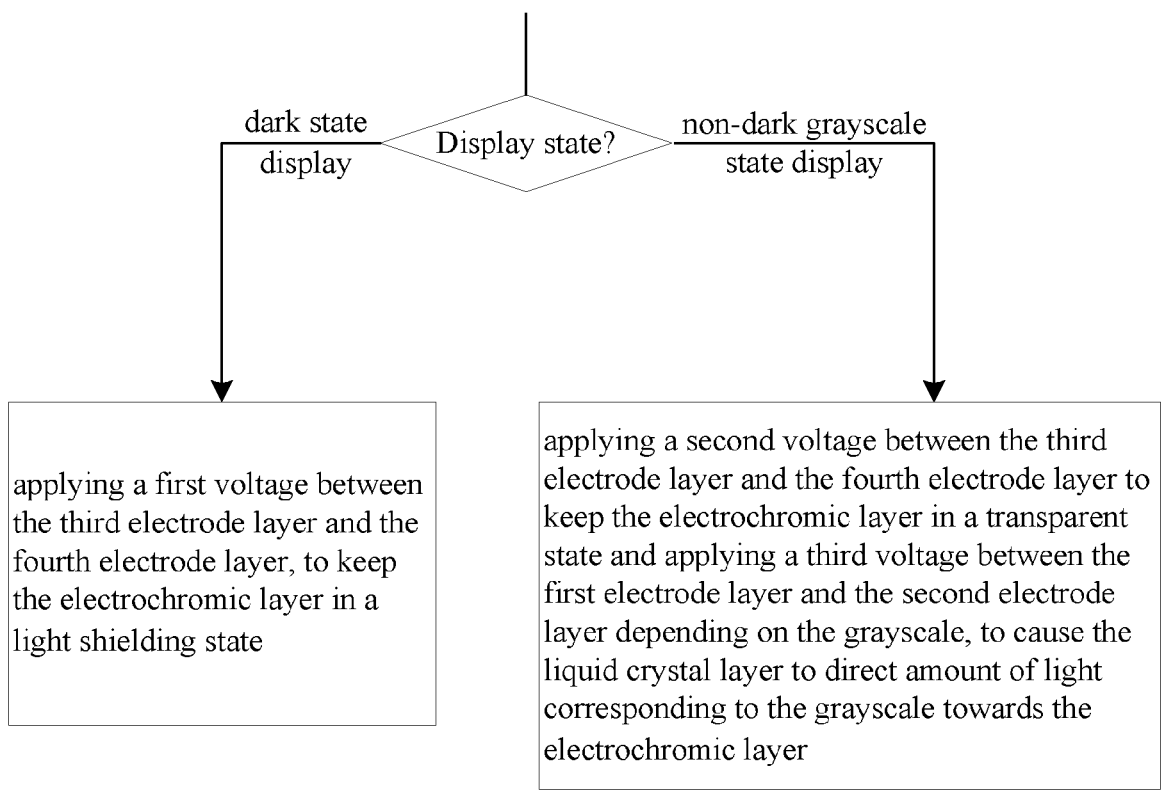
FIG. 8 is a flow chart of a method for controlling a display assembly according to an embodiment of the present disclosure.

An embodiment of the present disclosure also provides a method for controlling the display assembly. For example, as shown in FIG. 8, the method may include:

S1: in response to a dark state display, applying a first voltage between the third electrode layer and the fourth electrode layer, to keep the electrochromic layer in a light shielding state; and S2: in response to a non-dark grayscale state display, applying a second voltage between the third electrode layer and the fourth electrode layer to keep the electrochromic layer in a transparent state and applying a third voltage between the first electrode layer and the second electrode layer depending on the grayscale, to cause the liquid crystal layer to direct an amount of light corresponding to the grayscale towards the electrochromic layer.

The skilled person in the art can understand clearly that, for the sake of convenience and conciseness of description, the data processing method as described above may be used to an electronic apparatus. The electronic apparatus may be that having been described in the above product embodiments. The details will be omitted here.

The above embodiments of the present disclosure are merely exemplary, and are not intended to limit the present disclosure. The scope of the present disclosure is defined by the appended claims. Various modifications or equivalent substitutions may be made to the present disclosure by those skilled in the art without departing from the spirit and scope of the present disclosure, and such modifications or equivalent substitutions should fall within the scope of the present disclosure.

What is claimed is:

1. A display assembly, comprising:
    a first substrate and a second substrate opposite to each other;
    a liquid crystal layer between the first substrate and the second substrate;
    a first part, comprising a first light shielding portion, a second light shielding portion and an electrochromic portion; and
    a second part, comprising a third light shielding portion, a fourth light shielding portion and a transparent portion,
        wherein the first part is arranged on a side of the first substrate facing towards the second substrate, and the electrochromic portion is located between the first light shielding portion and the second light shielding portion in a direction parallel to the first substrate,
        wherein the second part is arranged on a side of the second substrate facing towards the first substrate, and the transparent portion is located between the third light shielding portion and the fourth light shielding portion in a direction parallel to the second substrate,
        wherein a first electrode layer and a second electrode layer are arranged between the first substrate and the second substrate and configured to adjust states of liquid crystal molecules in the liquid crystal layer,
        wherein the display assembly has a first grayscale state in which the electrochromic portion is opaque, a second grayscale state in which the electrochromic portion is transparent and the liquid crystal layer transmits all of incident light to the electrochromic portion, and a third grayscale state in which the electrochromic portion is transparent and the liquid crystal layer transmits part of incident light to the electrochromic portion, and wherein voltage between the first electrode layer and the second electrode layer is controlled for varying the light emitting angle from the liquid crystal layer.

2. The display assembly according to claim 1, wherein the projection of the transparent portion on the first layer is inside or equal to the electrochromic portion.

3. The display assembly according to claim 1, wherein the electrochromic portion comprises an electrochromic layer, a third electrode layer and a fourth electrode layer, the third electrode layer and the fourth electrode layer being located on both sides of the electrochromic layer respectively.

4. The display assembly according to claim 3, further comprising:
a first drive circuit electrically connected to the third electrode layer and the fourth electrode layer and configured to apply voltage between the third electrode layer and the fourth electrode layer; and
a second drive circuit electrically connected to the first electrode layer and the second electrode layer and configured to apply voltage between the first electrode layer and the second electrode layer.

5. The display assembly according to claim 4, further comprising:
a memory; and
a processor;
wherein the processor is configured to:
in response to a dark state display, send a first instruction to the first drive circuit to apply a first voltage between the third electrode layer and the fourth electrode layer, the first voltage keeping the electrochromic layer in a light shielding state; and
in response to a non-dark grayscale state display, send a second instruction to the first drive circuit to apply a second voltage between the third electrode layer and the fourth electrode layer and send a third instruction to the second drive circuit to apply a third voltage between the first electrode layer and the second electrode layer depending on grayscale, the second voltage keeping the electrochromic layer in a transparent state, the third voltage causing the liquid crystal layer to direct an amount of light corresponding to the grayscale towards the electrochromic layer.

6. The display assembly according to claim 1, wherein the transparent portion is a light collimator.

7. The display assembly according to claim 6, wherein the light collimator includes a collimating grating.

8. The display assembly according to claim 3, wherein the third electrode layer and the fourth electrode layer are transparent.

9. The display assembly according to claim 1, wherein the first light shielding portion, the second light shielding portion, the third light shielding portion and the fourth light shielding portion are formed in a black matrix.

10. The display assembly according to claim 1, wherein the first light shielding portion, the second light shielding portion, the third light shielding portion and the fourth light shielding portion are constructed as a black matrix.

11. The display assembly according to claim 1, further comprising an insulation layer, which is arranged between the first electrode layer and the second electrode layer, and the first electrode layer and the second electrode layer are arranged in stack on a side of the liquid crystal layer facing towards the second substrate.

12. The display assembly according to claim 11, wherein the first electrode layer comprises a plurality of strip electrodes in parallel to each other.

13. The display assembly according to claim 11, wherein the second electrode layer comprises a plate electrode.

14. The display assembly according to claim 1, wherein the first electrode layer is arranged on a side of the liquid crystal layer facing towards the first substrate, and the second electrode layer is arranged on a side of the liquid crystal layer facing towards the second substrate.

15. The display assembly according to claim 14, wherein (i) the first electrode layer comprises a plurality of strip electrodes in parallel to each other, and the second electrode layer comprises a plate electrode or (ii) the second electrode layer comprises a plurality of strip electrodes in parallel to each other, and the first electrode layer comprises a plate electrode.

16. The display assembly according to claim 1, further comprising a resin layer arranged between the liquid crystal layer and the first part.

17. The display assembly according to claim 1, wherein each of the first substrate and the second substrate is a glass substrate.

18. The display assembly according to claim 1, wherein the first electrode layer comprises a pixel electrode and the second electrode layer comprises a common electrode.

19. An electronic apparatus comprising the display assembly according to claim 1.

* * * * *